(12) United States Patent
Eash (10) Patent No.: US 10,012,277 B2
(45) Date of Patent: Jul. 3, 2018

(54) BRACKET FOR BRAKE CALIPER COVER

(71) Applicant: E&G Corporation, LLC, Savage, MD (US)

(72) Inventor: Lynn Eash, Savage, MD (US)

(73) Assignee: E&G CORPORATION, LLC, Savage, MD (US)

( * ) Notice: Subject to any disclaimer, the term of this patent is extended or adjusted under 35 U.S.C. 154(b) by 19 days.

(21) Appl. No.: 15/233,042

(22) Filed: Aug. 10, 2016

(65) Prior Publication Data

US 2018/0045257 A1    Feb. 15, 2018

(51) Int. Cl.
| | |
|---|---|
| *F16D 55/225* | (2006.01) |
| *F16D 65/00* | (2006.01) |
| *F16M 13/02* | (2006.01) |
| *F16D 55/00* | (2006.01) |

(52) U.S. Cl.
CPC ....... *F16D 65/0081* (2013.01); *F16D 55/225* (2013.01); *F16D 65/0025* (2013.01); *F16D 2055/002* (2013.01); *F16M 13/02* (2013.01)

(58) Field of Classification Search
CPC ... B32B 3/06; F16D 55/225; F16D 2055/002; F16D 2055/0037; F16D 65/0081; F16D 65/0025; F16D 65/0031; F16D 65/84; F16M 13/02
See application file for complete search history.

(56) References Cited

U.S. PATENT DOCUMENTS

| | | | | |
|---|---|---|---|---|
| 3,556,265 | A * | 1/1971 | Shakespear | F16D 55/2262 188/73.43 |
| 4,609,077 | A * | 9/1986 | Nakatsuhara | F16D 55/227 188/250 E |
| 7,299,903 | B2 * | 11/2007 | Rockwell | F16D 65/0972 188/73.36 |
| 9,016,442 | B2 * | 4/2015 | Odaira | F16D 55/226 188/72.3 |
| 2004/0262099 | A1 * | 12/2004 | Crippa | F16D 55/22 188/73.35 |
| 2005/0194222 | A1 * | 9/2005 | Stickney | F16D 55/224 188/73.38 |
| 2006/0158020 | A1 * | 7/2006 | Dagh | B60B 7/04 301/37.371 |
| 2009/0152056 | A1 * | 6/2009 | Heinz | F16D 65/097 188/72.5 |
| 2010/0163350 | A1 * | 7/2010 | Bach | F16D 55/226 188/73.43 |
| 2013/0095278 | A1 * | 4/2013 | Collura | B32B 3/06 428/99 |
| 2017/0037916 | A1 * | 2/2017 | Crippa | F16D 65/0977 |

* cited by examiner

*Primary Examiner* — Anita M King
(74) *Attorney, Agent, or Firm* — Seyfarth Shaw LLP (57) ABSTRACT

Disclosed is a caliper cover and associated bracket. The bracket includes a surface configuration that guides the bracket along the caliper and/or that applies an elastic force against the caliper for more stable assembly. The bracket also includes an engagement structure with an engagement tab that couples the bracket to the caliper, and an opening for allowing a bolt or other fastener to fasten the caliper cover to the bracket and caliper.

15 Claims, 7 Drawing Sheets

BRACKET FOR BRAKE CALIPER COVER

TECHNICAL FIELD OF THE INVENTION

The present application relates generally to brackets. More particularly, the present application relates to brackets for brake caliper covers.

BACKGROUND OF THE INVENTION

Brake calipers are an important component to the automobile braking system. Brake calipers squeeze the brake pads against the surface of the brake rotor to begin the braking process. Brake calipers can be moved to allow for replacement of brake pads when the pads become worn.

Calipers can become rusty or otherwise aesthetically unpleasing and further require protection from dust and debris. As a result, caliper covers were created to shield the caliper with a sometimes colorful and more aesthetically pleasing cover. The caliper cover enhances the view of the caliper and creates the impression that the caliper was painted in a more expensive and upgraded brake system. Caliper covers also allow easier cleaning of the caliper due to a more smooth, painted finish as compared to a coarse, pitted finish of the cast factory caliper.

Caliper covers attach to the caliper in a variety of ways, for example, fastening directly to the caliper or brake or attaching via a bracket. However, current brackets are cumbersome or inadequately fasten the caliper cover to the caliper. Other caliper covers include numerous parts requiring an extended fastening process.

SUMMARY OF THE INVENTION

The present invention includes a caliper cover and associated bracket that stably and efficiently holds a caliper cover against a caliper. The bracket includes a surface configuration that guides the bracket along the caliper, and in some instances applies an elastic force against the caliper for more stable assembly. The bracket also includes an engagement structure that engages the caliper so that the bracket can couple to the caliper, and an opening for securing the cover to the bracket.

In particular, the present invention includes a bracket including a body extending in a first direction and having first and second extreme ends, a tab configuration adapted to contact a caliper and guide the bracket along the caliper, engagement structure adapted to couple the bracket to the caliper, and an opening adapted to receive a fastener and couple the bracket to a caliper cover.

Further disclosed is a caliper cover including a bracket having a body extending in a first direction and having first and second extreme ends, a tab configuration adapted to contact a caliper and guide the bracket along the caliper, engagement structure adapted to couple the bracket to the caliper, an opening adapted to receive a fastener and couple the bracket to a caliper cover, and a cover adapted to couple to the bracket.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention includes a caliper cover and associated bracket. The bracket includes various tabs that guide the bracket along the caliper. In some embodiments, the tabs apply an elastic force against the caliper for more stable assembly. The bracket also includes an engagement structure that couples the bracket to the caliper, and an opening for allowing a bolt or other fastener to fasten the caliper cover to the bracket and caliper.

Figure 1:
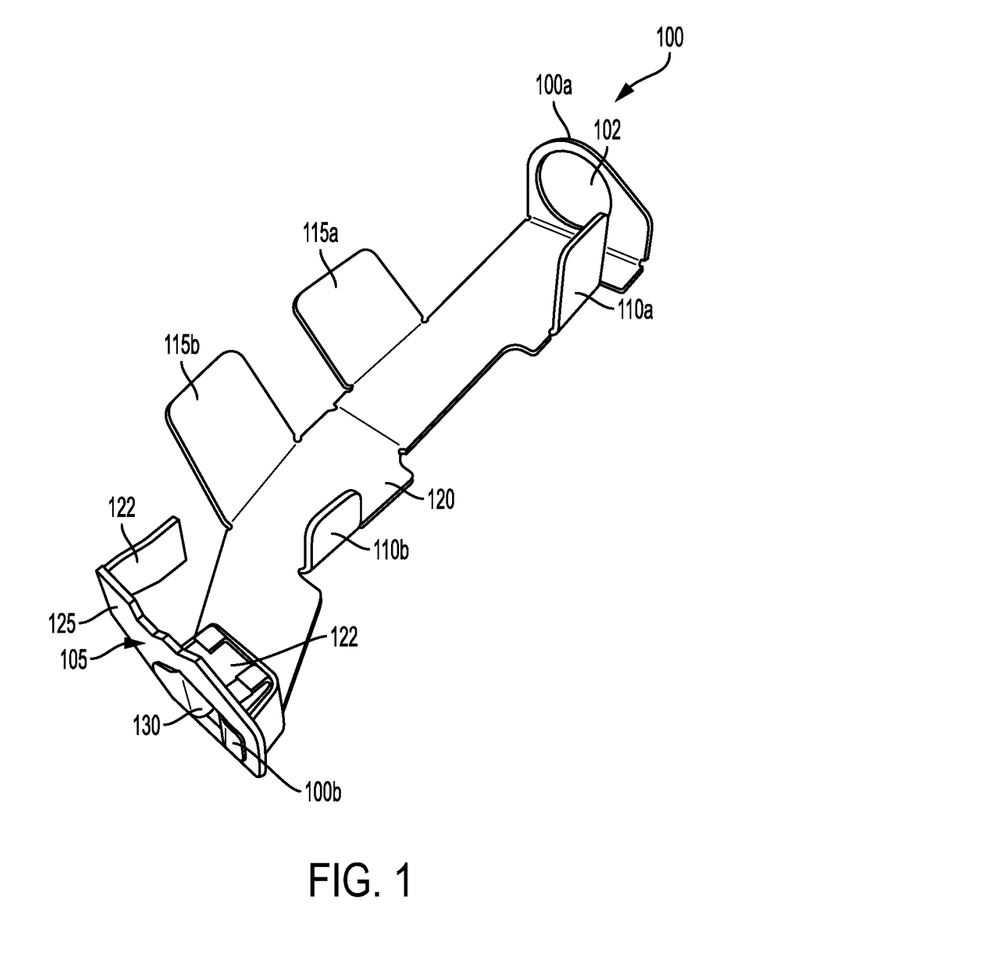
FIG. 1 illustrates a bracket according to embodiments of the present application.

As shown in FIG. 1, a bracket 100 includes an opening 102 on a first extreme end 100a and an engagement portion 105 on a second extreme end 100b opposite the first extreme end 100a. As discussed below, the opening 102 is adapted to receive a fastener, and the engagement portion is adapted to couple to a caliper and/or a caliper cover, to secure the bracket 100 to the caliper. A tab configuration can further guide the bracket 100 onto the caliper with their surface orientation. For example, the bracket 100 can include first side tabs 110a,b and second side tabs 115a,b to passively engage the caliper and guide the bracket 100 along the caliper. Alternatively, the side tabs 110a,b, 115a,b can be elastically biased against the caliper to provide a more firm engagement of the bracket around the caliper. The side tabs 110a,b, 115a,b can be disposed on or coupled to a base 120, and can extend perpendicular to the direction the base 120 extends.

The opening 102 can be sized or shaped in any manner so as to allow a fastener to be inserted therethrough and couple the bracket 100 to a caliper. For example, the opening 102 is shown as being a circular opening for a bolt, but the present invention is not so limited, and the opening 102 can be any shape or size. The opening 102 can also be implemented in any location on the bracket 100, or more than one opening 102 can be implemented, without departing from the spirit and scope of the present invention. For example, the opening 102 is shown as being located at a first extreme end 100a of the bracket 100, but the opening 102 can be located on a side of the bracket 100 or at a second extreme end 100b opposite the first extreme end 100a.

The side tabs 110a,b, 115a,b can also be any size and shape so as to allow a surface configuration that passively couples the bracket 100 to a caliper. The size, shape, and number of the side tabs 110a,b, 115a,b can, in certain embodiments, depend on the vehicle the bracket 100 is associated with. That is, certain vehicles have differently shaped calipers as compared to other vehicles. The size, shape, and number of the side tabs 110a,b, 115a,b can therefore be variable from one vehicle to another. The number of first side tabs 110a,b can be greater than, equal to, or less than the number of second side tabs 115a,b, or in certain embodiments, the bracket 100 can have only first side tabs 110a,b or second side tabs 115a,b.

The base 120 acts as the structural backbone for the bracket and provides support for the side tabs 110a,b, 115a,b, opening 102, and engagement portion 105. The base 120 can therefore be any size or shape structure capable of performing such a function.

Figure 2:
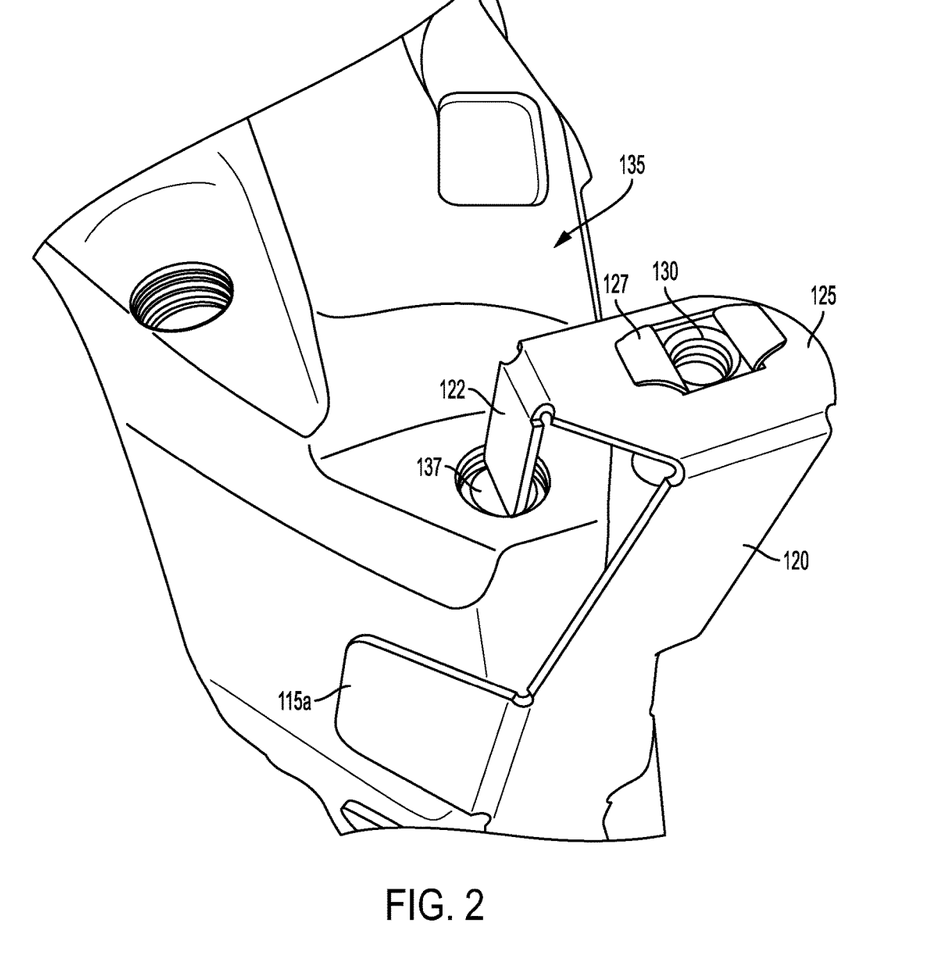
FIG. 2 illustrates a bracket engaged with a caliper according to embodiments of the present application.

The engagement portion 105 is illustrated in, for example, FIGS. 1 and 2 and can include an engagement tab 122 for engaging with a caliper, an engagement base 125 extending from the engagement tab, and coupling structure 127 formed at the second extreme end 100b of the bracket 100. A bolt opening 130 can be provided at the second extreme end 100b for receiving a bolt or other fastener and coupling the second extreme end 100b to a caliper cover, discussed below in more detail. The bracket can couple to a caliper 135, and the caliper 135 can include a receiving portion 137 for receiving the engagement tab 122.

The engagement tab 122 is shown as being a rectangular metal plate, but the present invention is not so limited. The engagement tab 122 can be any structure capable of engaging an opening in a caliper, for example the receiving portion 137, in a passive or active manner. The receiving portion 137 can similarly be any structure or negative space that receives an object. The engagement tab 122 is shown extending from the engagement base 125, although the present invention is not so limited. For example, the engagement tab 122 can extend from the base 120, either extreme end 100a,b of the bracket 100, or any other portion of the bracket 100.

As illustrated, the coupling structure 127 couples the bolt opening 130 to the engagement base 125. However, the present invention can include an integral bolt opening 130 so as to omit the coupling structure 127 entirely. The coupling structure 127 can be any structure that couples the bolt opening 130 to the engagement base 125, and as shown, can be two wings that are bent over an opening in the engagement base 125.

The bolt opening 130 can be any structure capable of receiving a bolt or other fastener and coupling the bracket 100 to a caliper cover or other structure. As shown, the bolt opening is a tubular structure with female threads. However, the bolt opening 130 is not limited to threaded or bolt arrangements, and can include any structure or negative space capable of receiving another object.

Figure 3:
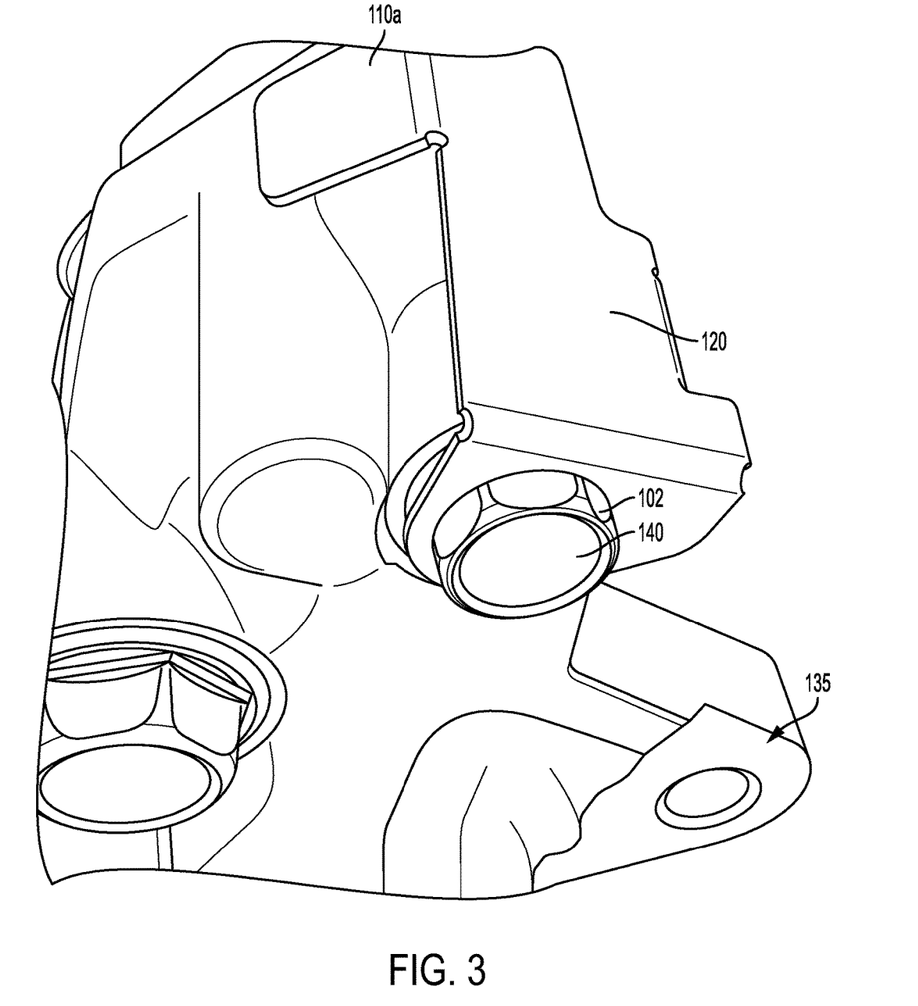
FIG. 3 illustrates another view of a bracket and caliper according to embodiments of the present application.

As shown in FIG. 3, the bracket 100 can couple to the caliper 135 at the first extreme end 100a of the bracket 100. A bolt 140 or other suitable fastener can couple the bracket 100 to the caliper 135 by inserting through the opening 102 and into structure within the caliper 135 capable of receiving the bolt 140. The bolt 140 need not be a bolt at all, and can be any fastener capable of coupling the bracket 100 to a caliper 135.

Figure 4:
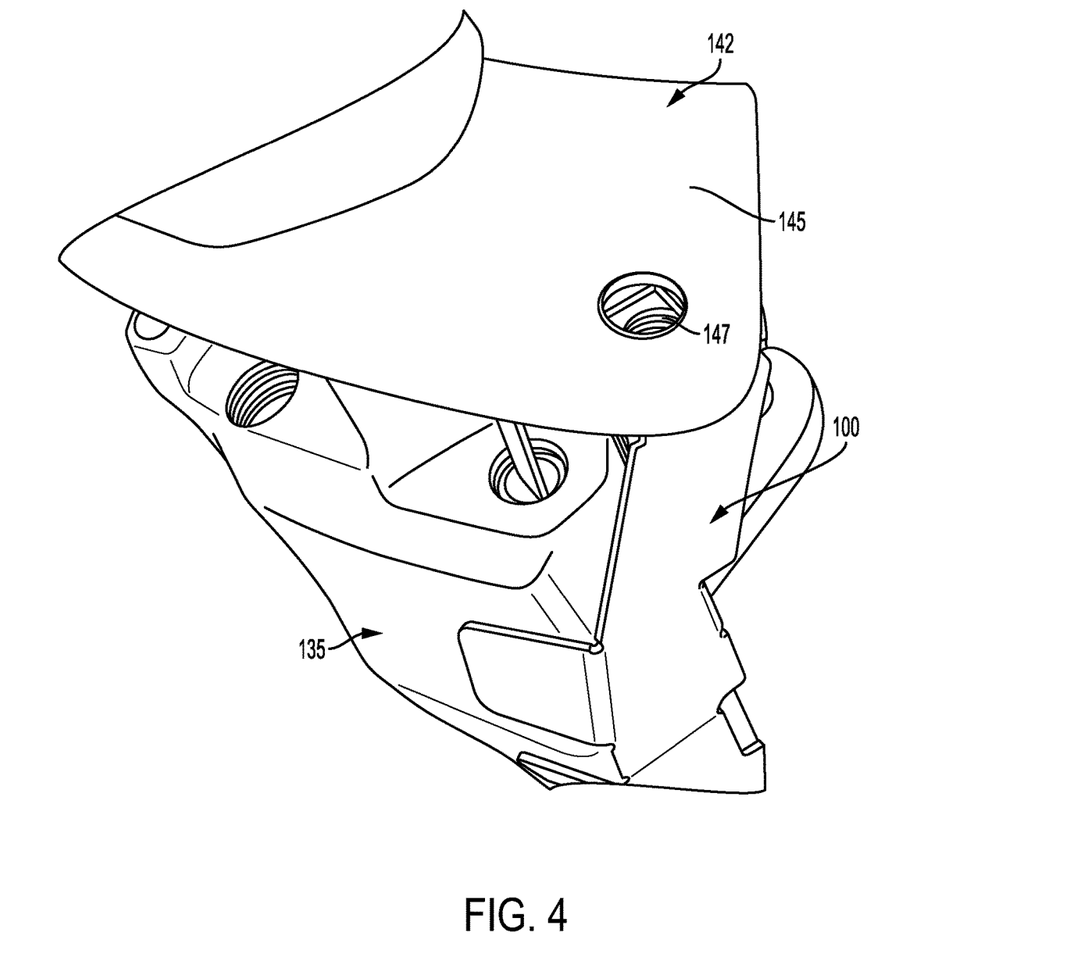
FIG. 4 illustrates a caliper cover, bracket, and caliper according to embodiments of the present application.
Figure 5:
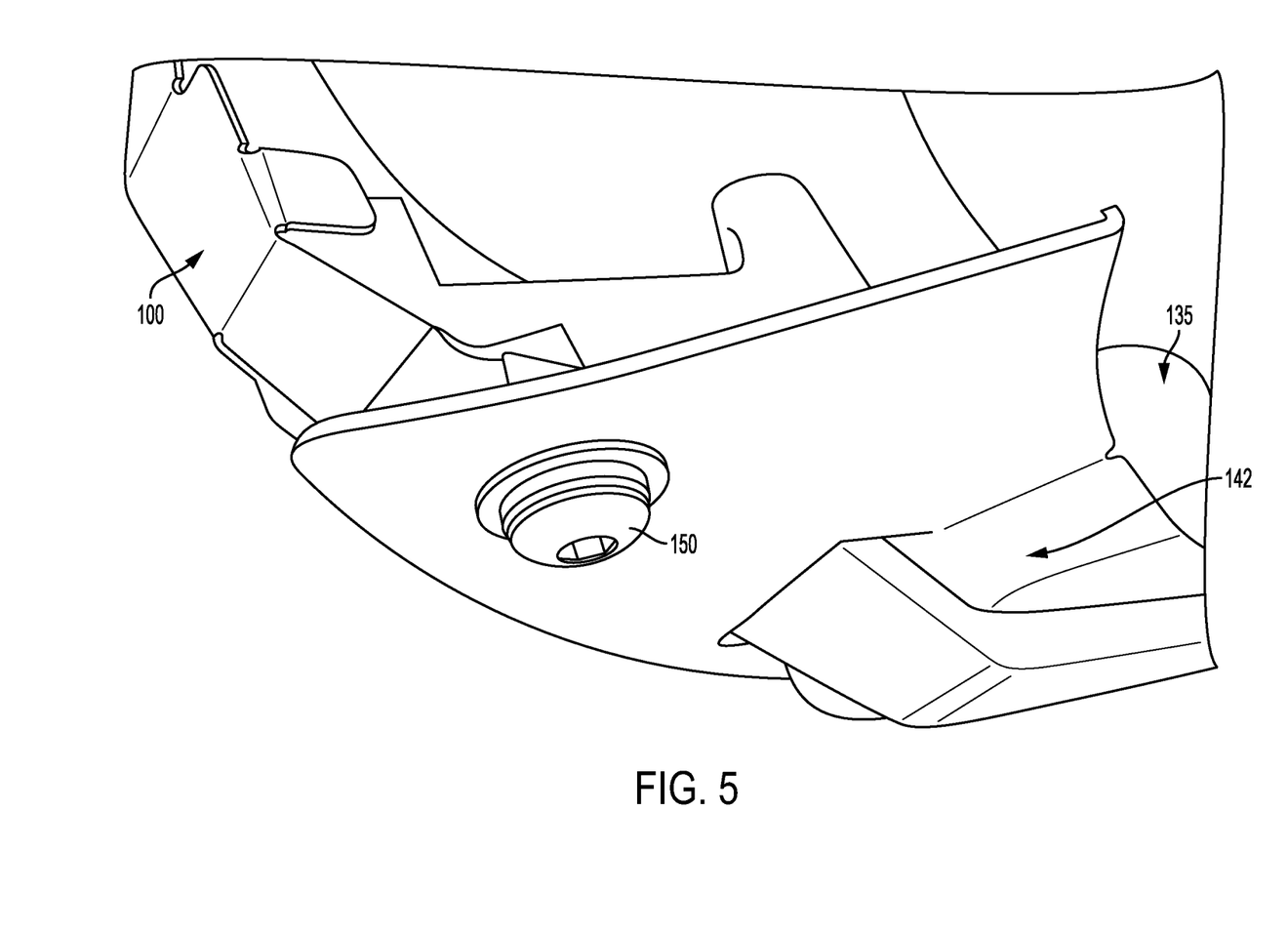
FIG. 5 illustrates another view of a caliper cover, bracket, and caliper according to embodiments of the present application.

FIG. 4 illustrates a caliper 135, bracket 100, and front caliper cover 142 according to embodiments of the present application. As shown, the front caliper cover 142 includes a front base 145 and a front opening 147. The front base 145 covers the caliper 135 and can be painted or otherwise colored to provide a more pleasing aesthetic appearance relative to the caliper 135. The front opening 147 allows a screw or other fastener to couple the front caliper cover 142 to the bracket 100 and, ultimately, the caliper 135. For example, as shown in FIG. 5, a fastener 150 such as a screw and washer combination can couple the front caliper cover 142 to the bracket 100 and caliper 135. The fastener 150 need not be a screw, however, and can be any fastener or fastening means capable of coupling two objects to one another.

Figure 6:
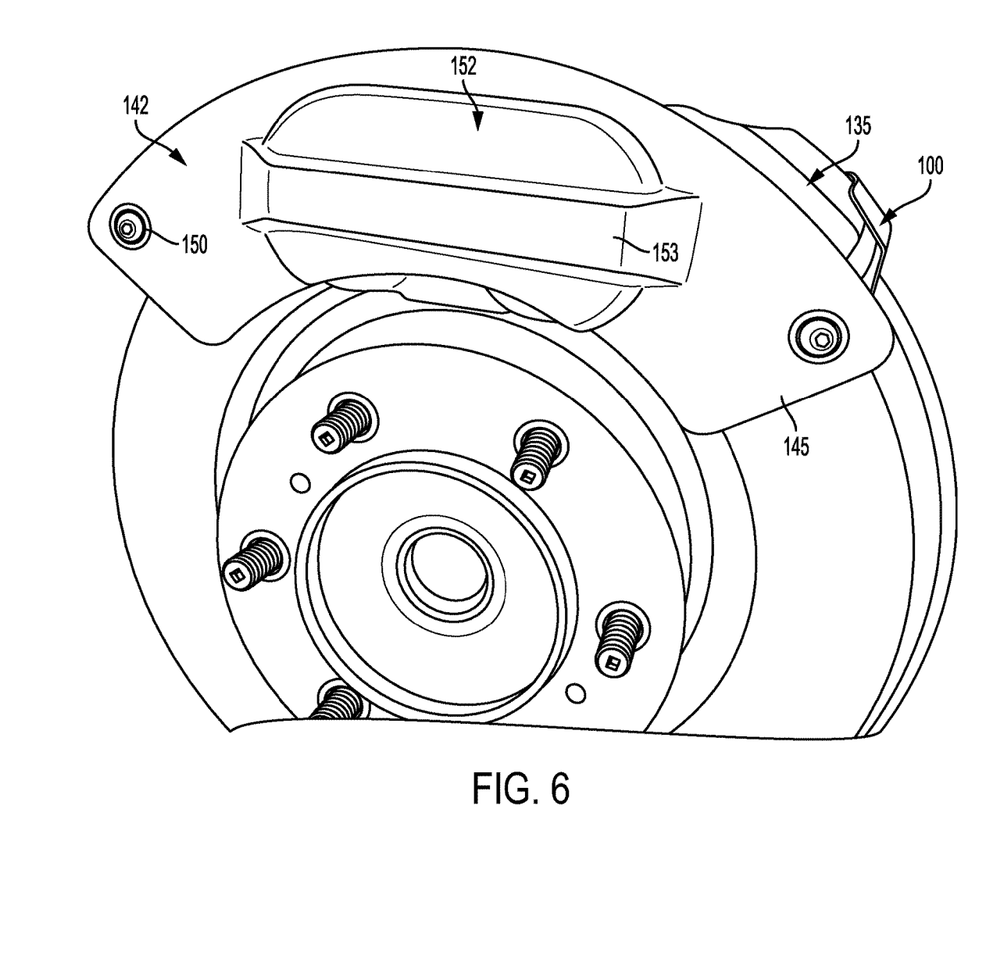
FIG. 6 illustrates yet another view of a caliper cover, bracket, and caliper illustrating a front caliper cover according to embodiments of the present application.

As shown in FIG. 6, the front caliper cover 142 can include a protruding portion 152 with a strip 153. The protruding portion 152 can be a three dimensional dome-type structure that provides a more three dimensional appearance for the front caliper cover 142 and better clearance with respect to the wheel of the vehicle. The strip 153 can be the same shape as the caliper 135 itself to better fit the front caliper cover 142 to the caliper 135. Both the protruding portion 152 and strip 153 can be integral with the front base 145 and formed, for example, during casting or molding. The protruding portion 152 and strip 153 can also be separate items that are welded or otherwise coupled to the front base 145 through an opening in the front base 145. For example, the protruding portion 152 and strip 153 can be a single, molded or cast component, and can be welded to the front base 145 along the edges of the protruding portion 152.

Figure 7:
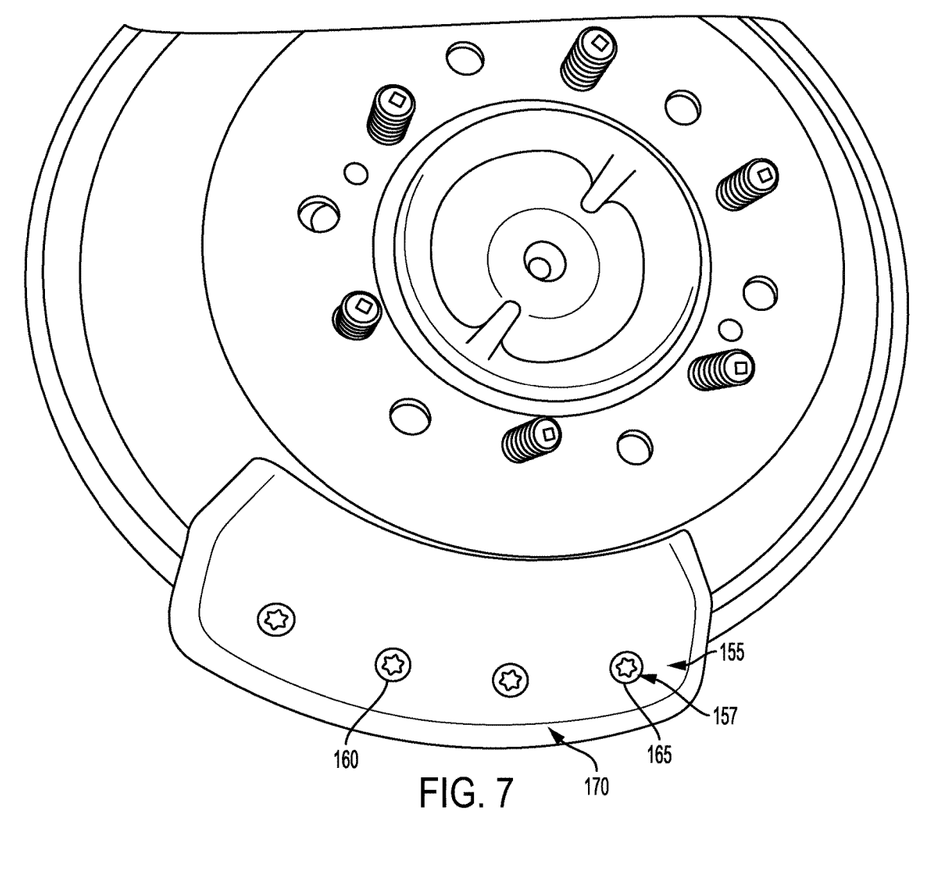
FIG. 7 illustrates another caliper cover, with a bracket and caliper, according to embodiments of the present application.

FIG. 7 illustrates a rear caliper cover 155 according to embodiments of the present application. The rear caliper cover 155 can be formed of two separate pieces, with an internal piece 157 having protrusions 160 extending through rear openings 165 of an external portion 170. The protrusions 160 can be painted or otherwise colored silver to provide the appearance of bolts, and the external portion 170 can similarly be painted to appear more aesthetically pleasing than the caliper 135, similar to the front caliper cover 142 discussed above. The internal portion 157 and external portion 170 can be coupled to one another in any known manner.

The above disclosure focuses on an exemplary embodiment of the bracket 100, where the bracket 100 is coupled to a caliper and used in connection with a caliper cover. However, the present invention is not so limited, and the bracket 100 can be implemented in any manner independent of a caliper.

As discussed herein, the term "coupled" is intended to refer to any connection, direct or indirect, and is not limited to a direct connection between two or more elements of the disclosed invention. Similarly, "operatively coupled" is not intended to mean any direct connection, physical or otherwise, and is merely intended to define an arrangement where two or more elements communicate through some operative means (e.g., through conductive or convective heat transfer, or otherwise). The term "coupled" can mean, in some embodiments, two objects being integral with one another.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A bracket comprising:
    a body extending in a first direction and having first and second extreme ends;
    a tab configuration elastically biased against a caliper and adapted to guide the bracket along the caliper, the tab configuration comprising a plurality of tabs extending perpendicular to the first direction;
    engagement structure adapted to couple the bracket to the caliper; and
    an opening adapted to receive a fastener and couple the bracket to a caliper cover.

2. The bracket of claim 1, at least some tabs in the tab configuration extending in a direction opposite to other of tabs in the tab configuration.

3. The bracket of claim 1, wherein the engagement structure is disposed at the second extreme end.

4. A bracket comprising:
    a body extending in a first direction and having first and second extreme ends;
    a tab configuration adapted to contact a caliper and guide the bracket along the caliper;
    engagement structure adapted to couple the bracket to the caliper; and
    an opening adapted to receive a fastener and couple the bracket to a caliper cover, wherein the opening is disposed at the first extreme end.

5. A bracket comprising:
    a body extending in a first direction and having first and second extreme ends;
    a tab configuration adapted to contact a caliper and guide the bracket along the caliper;
    engagement structure adapted to couple the bracket to the caliper;
    an opening adapted to receive a fastener and couple the bracket to a caliper cover; and
    coupling structure disposed proximate the opening and adapted to couple to structure having the opening.

6. A caliper cover comprising:
    a bracket including:
        a body extending in a first direction and having first and second extreme ends;
        a tab configuration elastically biased against a caliper and adapted to guide the bracket along the caliper, the tab configuration comprising a plurality of tabs extending perpendicular to the first direction;
        engagement structure adapted to couple the bracket to the caliper; and
        an opening adapted to receive a fastener for coupling the bracket; and
    a cover adapted to couple to the bracket.

7. The caliper cover of claim 6, wherein the engagement structure is disposed at the second extreme end.

8. The caliper cover of claim 6, wherein the cover includes an internal portion and an external portion coupled to the internal portion.

9. The caliper cover of claim 6, wherein the cover includes a front base and a protruding portion protruding from the front base.

10. The caliper cover of claim 9, wherein the protruding portion includes a strip adapted to conform to a shape of the caliper.

11. The caliper cover of claim 9, wherein the protruding portion is coupled to the front base.

12. A caliper cover comprising:
    a bracket including:
        a body extending in a first direction and having first and second extreme ends;
        a tab configuration adapted to contact a caliper and guide the bracket along the caliper, the tab configuration comprising a plurality of tabs extending perpendicular to the first direction, at least some of the tabs extending in a direction opposite to other of the tabs;
        engagement structure adapted to couple the bracket to the caliper; and
        an opening adapted to receive a fastener for coupling the bracket; and
    a cover adapted to couple to the bracket.

13. A caliper cover comprising:
    a bracket including:
        a body extending in a first direction and having first and second extreme ends;
        a tab configuration adapted to contact a caliper and guide the bracket along the caliper;
        engagement structure adapted to couple the bracket to the caliper; and
        an opening adapted to receive a fastener for coupling the bracket; and
    a cover adapted to couple to the bracket, wherein the opening is disposed at the first extreme end.

14. A caliper cover comprising:
    a bracket including:
        a body extending in a first direction and having first and second extreme ends;
        a tab configuration adapted to contact a caliper and guide the bracket along the caliper;
        engagement structure adapted to couple the bracket to the caliper; and
        an opening adapted to receive a fastener for coupling the bracket; and
        coupling structure disposed proximate the opening and adapted to couple to structure having the opening; and
    a cover adapted to couple to the bracket.

15. A caliper cover comprising:
    a bracket including:
        a body extending in a first direction and having first and second extreme ends;
        a tab configuration adapted to contact a caliper and guide the bracket along the caliper;
        engagement structure adapted to couple the bracket to the caliper; and
        an opening adapted to receive a fastener for coupling the bracket; and
    a cover adapted to couple to the bracket, wherein the cover includes an internal portion and an external portion coupled to the internal portion, and wherein the external portion includes at least one rear opening adapted to expose at least a portion of the internal portion.

* * * * *